United States Patent
Nikulina et al.

(10) Patent No.: US 6,776,957 B1
(45) Date of Patent: Aug. 17, 2004

(54) ZIRCONIUM-BASED ALLOY ELEMENTS USED IN NUCLEAR REACTOR CORES

(75) Inventors: Antonina Vasilievna Nikulina, Moscow (RU); Pavel Vasilievich Shebaldov, Moscow (RU); Vyacheslav Nikolaevich Shishov, Moscow (RU); Mikhail Mikhailovich Peregud, Moscow (RU); Lidiya Efimovna Ageenkova, Moscow (RU); Vladimir Vladimirovich Rozhdestvensky, Glazov (RU); Mikhail Ivanovich Solonin, Moscow (RU); Yury Konstantinovich Bibilashvili, Moscow (RU); Petr Ivanovich Lavrenjuk, Moscow (RU); Anatoly Frantsevich Lositsky, Glazov (RU); Nikolai Alexeevich Ganza, Glazov (RU); Nikolai Vasilevich Kuzmenko, Glazov (RU); Vladimir Andreevich Kotrekhov, Glazov (RU); Jury Pavlovich Shevnin, Glazov (RU); Vladimir Andreevich Markelov, Glazov (RU)

(73) Assignees: The Federal State Unitarian Enterprise AA, Moscow (RU); JSC TVEL (RU)

( * ) Notice: Subject to any disclaimer, the term of this patent is extended or adjusted under 35 U.S.C. 154(b) by 0 days.

(21) Appl. No.: 10/030,881

(22) PCT Filed: Oct. 8, 1999

(86) PCT No.: PCT/RU99/00368

§ 371 (c)(1),
(2), (4) Date: Oct. 22, 2001

(87) PCT Pub. No.: WO00/65116

PCT Pub. Date: Nov. 2, 2000

(30) Foreign Application Priority Data

Apr. 22, 1999 (RU) .......................................... 99107802

(51) Int. Cl.$^7$ ................................................ C22C 16/00
(52) U.S. Cl. ...................................................... 420/422
(58) Field of Search ......................................... 420/422

(56) References Cited

U.S. PATENT DOCUMENTS

| | | | |
|---|---|---|---|
| 5,125,985 A | 6/1992 | Foster et al. | |
| 5,366,690 A | 11/1994 | Garde | |
| 5,560,790 A | * 10/1996 | Nikulina et al. ............ | 148/672 |
| 6,368,429 B1 | * 4/2002 | Zavodchikov et al. ...... | 148/672 |

FOREIGN PATENT DOCUMENTS

| | | |
|---|---|---|
| EP | 0532830 A1 | 3/1993 |
| EP | 0538778 A1 | 4/1993 |
| EP | 0720177 A1 | 7/1996 |
| JP | 01301830 A | 12/1989 |
| RU | 2032759 C1 | 4/1995 |

* cited by examiner

*Primary Examiner*—Daniel Jenkins
(74) *Attorney, Agent, or Firm*—J. Herbert O'Toole; Nexsen Pruet, LLC

(57) ABSTRACT

A zirconium-based alloy for the components of the active core of nuclear reactors comprises (on a weight percent basis): niobium, 0.5–3.0; iron, 0.005–0.5; oxygen, 0.03–0.2; carbon, 0.001–0.04; silicon, 0.002–0.1; nickel, 0.003–0.02; zirconium being the balance; the alloy structure is characterized by an α-solid solution and the β Nb-phase particles sized below 0.1 μm and having the niobium content of from 60 to 95%. The alloy may further comprise particles of intermetallics Zr—Fe—Nb with the Fe/Nb ratio of 0.05–0.2. The alloy structure may also be characterized by an oxygen-hardened α-solid solution and by the β Nb-phase particles, and may further comprise particles of intermetallics Zr—Fe—Nb sized below 0.3 μm.

8 Claims, No Drawings

ZIRCONIUM-BASED ALLOY ELEMENTS USED IN NUCLEAR REACTOR CORES

TECHNICAL FIELD

The present invention relates to metallurgy, more particularly to zirconium-based alloys used in the active core of nuclear reactors.

BACKGROUND ART

Zirconium-based alloys find application as construction elements of the active core of nuclear power reactors operating on thermal neutrons, such as fuel claddings, pipes for process channels, and other construction elements.

Quite a number of requirements are imposed upon the alloys mentioned above, that is, as to corrosion resistance in water and high-temperature steam, strength characteristics, resistance to oxidation, hydrogenation, radiation growth, and creep. In addition, the alloy must possess high processability.

Known in the present state of the art is a zirconium-based alloy containing 1–4 wt. % niobium and 0.1–0,2 wt. % oxygen and consisting predominantly of a martensitic transformation of the β-phase and a finely dispersed secondary phase rich in niobium (cf. GB Pat. A No 997761).

Products made from said known alloy feature but an inadequately broad complex of anticorrosion properties, including inadequately high resistance to nodular corrosion in boiling water.

Another zirconium-based alloy is known to comprise (on a weight percent basis): niobium, 0.5–1.5; tin, 0.9–1.5; iron, 0.3–0.6; chromium, 0.005–0.2; carbon, 0.005–0.04; oxygen, 0.05–0.15; silicon, 0.005–0.15, the structure of said alloy being a metallic matrix hardened with niobium- and iron-containing intermetallics having the following volumetric content of the sum of intermetallics: $Zr(Fe,Nb)_2 + Zr(Fe,Cr,Nb) + (Zr,Nb)_3Fe$ being at least 60% of a total content of the iron-containing intermetallics and a distance therebetween equal to $0.322 \pm 0.09$ μm (cf. RU Pat. A No 2032759).

Products made from said known alloy feature high strength characteristics, resistance to radiation growth, creep, and rust-proof quality. However, corrosion in a water medium affecting the products made of said known alloy results in forming a thicker oxide layer than is observed in the proposed alloy.

One more zirconium-based alloy is known to comprise (on the weight percent basis): niobium, 0.8–1.3; iron, 0.005–0.025; silicon, below 0.012; carbon, below 0.02; oxygen, below 0.16, zirconium being the balance (cf. EP A 0720177 A1).

This technical solution as being the closest to the herein-claimed one as to technical essence, is elected to be the prototype.

Products made of the alloy known from the prototype possess but an inadequately broad complex of anticorrosion and mechanical properties. A reduced niobium and iron content prevents preparing a structure that imparts high corrosion resistance to the alloy, especially resistance to nodular corrosion, as well as high strength and creep- and radiation growth resistance.

DISCLOSURE OF THE INVENTION

The principal object of this invention is the provision of a zirconium-based alloy for the components of the active core of nuclear reactors, the products made of said alloy possess stable properties, such as corrosion resistance, hardness, resistance to radiation growth and creep, and substantially high resistance to nodular corrosion, whereby the service life of the products in the active core of a nuclear reactor is substantially extended.

Said object is accomplished due to the fact that a zirconium-based alloy for the components of the active core of nuclear reactors, comprising niobium, iron, oxygen, carbon, and silicon, according to the invention, further comprises nickel, with the following ratio of the components (on a weight percent basis):

| | |
|---|---|
| niobium | 0.5–3.0 |
| iron | 0.005–0.02 |
| oxygen | 0.03–0.12 |
| carbon | 0.001–0.02 |
| silicon | 0.002–0.02 |
| nickel | 0.003–0.02 |
| zirconium | being the balance, | and the structure of the alloy further comprises β-particles of the Nb-phase which are sized less than 0.1 μm and are uniformly distributed in the α-solid solution, while said phase has a niobium percentage content of from 60 to 95. The structure may also further comprise intermetallic particles Zr—Fe—Nb sized less than 0.3 μm.

The alloy may be constituted by the following constituents taken in the following ratio therebetween (on a weight ratio basis):

| | |
|---|---|
| niobium | 0.5–3.0 |
| iron | 0.005–0.02 |
| oxygen | 0.03–0.12 |
| carbon | 0.001–0.02 |
| silicon | 0.002–0.02 |
| nickel | 0.003–0.02 |
| zirconium | being the balance, | with the niobium content of the beta-particles in the Nb-phase ranging between 75 and 95%.

The alloy may be constituted by the following constituents taken in the following ratio therebetween (on a weight ratio basis):

| | |
|---|---|
| niobium | 0.5–3.0 |
| iron | 0.02–0.5 |
| oxygen | 0.03–0.12 |
| carbon | 0.001–0.02 |
| silicon | 0.002–0.02 |
| nickel | 0.003–0.02 |
| zirconium | being the balance, | the iron/niobium ratio being 0.05:0.2.

The alloy may be constituted by the following constituents taken with the following ratio therebetween (on a weight ratio basis):

| | |
|---|---|
| niobium | 0.5–3.0 |
| iron | 0.005–0.5 |
| oxygen | 0.1–0.2 |
| carbon | 0.001–0.02 |

-continued

| | |
|---|---|
| silicon | 0.002–0.1 |
| nickel | 0.003–0.02 |
| zirconium | being the balance, | with the niobium content of the β-particles in the Nb-phase ranging between 75 and 95% and the α-solid solution being further oxygen-hardened.

The alloy proposed herein, in contradistinction to the prototype, allows one to obtain an optimum structure-phase state which provides for high corrosion resistance in water and steam media, as well as high hardness, creep- and radiation growth resistance.

Making products from the herein-proposed alloy by virtue of more exactly selected ratio between the constituents constituting said alloy enables one to create a definite alloy structure in finished products, which structure comprises α-solid solution of zirconium, uniformly distributed finely divided particles of the equilibrium β Nb-phase, solid solution of zirconium in niobium having a body-centered cubic lattice with the parameter 'a' equal to 3.3–3.35 Å and the niobium content in excess of 75% which corresponds to an equilibrium composition of the β Nb-phase. The structure of the material may also incorporate finely divided particles of intermetallics Zr—Fe—Nb.

The herein-proposed chemical analysis of the alloy and the presence of the β Nb-phase therein the particles of which are sized below 0.1 μm, the niobium content of said phase ranging within 75 and 95%, provides for establishing an equilibrium and superfine structure, thus adding to the stability of in-service characteristics of finished products, especially such characteristics as corrosion resistance and plasticity.

The 75 to 95% niobium content of the β Nb-phase provides for its state of equilibrium, and particle size distribution below 0.1 μm. Such a structure of the alloy imparts thereto high corrosion resistance in high-temperature water, and ductility. Taking into account the fact that corrosion resistance is the principal performance characteristics of zirconium products made use of in the active core of nuclear reactors, the alloy structure comprising the β Nb-phase of an equilibrium composition imparts high corrosion-resistance characteristics to finished products in high-temperature water.

The iron/niobium ratio below 0.2 enables one to additionally isolate particles of iron-containing intermetallics Zr—Fe—Nb sized less than 0.3 μm and uniformly distributed in the α-solid solution, thus adding to the in-service hardness characteristics of finished products. In addition, the presence of intermetallics Zr—Fe—Nb in the alloy structure increases resistance of said alloy to nodular corrosion under boiling conditions, which is accompanied by thinning of the wall and hydrogenation of the cladding, as well as formation of thick oxide films which reduce heat conductivity thereof. Presence of intermetallics Zr—Fe—Nb in the alloy structure reduces susceptibility of the alloy to nodular corrosion by 1.5–2 times.

With the iron/niobium ratio exceeding 0.2 the specified composition of the β Nb-phase is not observed, that is, the niobium proportion in the β Nb-phase is diminished, with the result that stability of anticorrosion properties is adversely affected.

An increased oxygen content of the alloy enhances creep- and radiation growth resistance at working temperatures by 2.5–6 times. Higher creep resistance is maintained in a neutron field as well. In addition, presence of oxygen stabilizes corrosion resistance and renders it less dependent on hot-working and heat-treatment conditions. As a result, anticorrosion and strength characteristics of the alloy are enhanced and stabilized due to oxygen-hardening of the α-solid solution.

BEST METHOD OF CARRYING OUT THE INVENTION

To promote understanding of the present invention, given below are some specific exemplary embodiments thereof.

EXAMPLE 1

Ingots were prepared from the alloy of the present invention, using the vacuum-arc melting technique. Then said ingots were subjected to a full processing cycle, namely, hot deformation (forging, rolling), β-quenching, press-forming in the upper portion of the α-region, and further to cold working involving intermediate α-annealing procedures to obtain a structure with a necessary set of phases adding to corrosion resistance and hardness, the principal part of which falls on the β Nb-phase with the particle size not in excess of 0.1 μm and the niobium content of from 75 to 95%.

In what follows the present invention is illustrated by Examples adduced in Tables 1, 2, and 3 of which Table 1 presents compositions of alloys according to the invention and to the prototype, Table 2 gives characteristics of the β Nb-phase, and Table 3 indicates properties of said alloys. The alloy disclosed in the prototype is prepared using the process technique as claimed in the present invention.

TABLE 1

| No of specimen | Alloying constituent, wt.% | | | | | | Structure |
|---|---|---|---|---|---|---|---|
| | niobium | iron | oxygen | carbon | silicon | nickel | |
| 1 | 1.1 | 0.01 | 0.1 | 0.008 | 0.006 | 0.005 | α-solid solution, β Nb-phase |
| 2 | 2.5 | 0.01 | 0.1 | 0.009 | 0.008 | 0.003 | α-solid solution, β Nb-phase |
| 3 | 2.5 | 0.5 | 0.05 | 0.02 | 0.02 | 0.006 | α-solid solution, β Nb-phase, intermetallics Zr—Fe—Nb |
| 4 | 2.0 | 0.1 | 0.03 | 0.001 | 0.002 | 0.02 | α-solid solution, β Nb-phase, intermetallics Zr—Fe—Nb |

TABLE 1-continued

| No of specimen | Alloying constituent, wt.% | | | | | | Structure |
|---|---|---|---|---|---|---|---|
| | niobium | iron | oxygen | carbon | silicon | nickel | |
| 5 | 1.5 | 0.01 | 0.2 | 0.015 | 0.005 | 0.02 | $O_2$-hardened α-solid solution, β Nb-phase |
| 6 | 0.5 | 0.005 | 0.15 | 0.04 | 0.1 | 0.02 | $O_2$-hardened α-solid solution, β Nb-phase |
| 7 | 0.4 | 0.004 | 0.02 | 0.01 | 0.01 | 0.008 | α-solid solution |
| 8 prototype | 0.8 | 0.005 | 0.1 | 0.001 | 0.005 | — | α-solid solution, secondary phase |

TABLE 2

Characteristics of β Nb-phase particles in material of finished product

| No of specimen | Particle size, μm | Particle spacing, μm | Nb content of β Nb-phase particles, % |
|---|---|---|---|
| 1 | 0,04 | 0,15–0,20 | 85 |
| 2 | 0,05 | 0,12–0,15 | 90 |
| 3 | 0,08 | 0,12–0,17 | 85 |
| 4 | 0,06 | 0,12–0,15 | 85 |
| 5 | 0,06 | 0,12–0,17 | 80 |
| 6 | 0,03 | 0,18–0,20 | 75 |
| 7 | — | — | — |
| 8 | — | — | — |

TABLE 3

| No of specimen | Creep rate, σ = 100 MPa at 350° C., %/h | Gain in weight in autoclave water at 350° C. and 168 Pa for 3000 h, mg/dm² | Radiation growth deformation at a fluence of $5.4 \cdot 10^{26}$ m$^{-2}$ (E > 0.1 MeV), % |
|---|---|---|---|
| 1 | $3{,}3 \cdot 10^{-4}$ | 35–40 | 1,50–1,70 |
| 2 | $2{,}0 \cdot 10^{-4}$ | 40–45 | 1,10–1,30 |
| 3 | $6{,}0 \cdot 10^{-5}$ | 35–40 | 0,40–0,45 |
| 4 | $9{,}0 \cdot 10^{-5}$ | 35–40 | 0,70–0,80 |
| 5 | $7{,}0 \cdot 10^{-5}$ | 37–42 | 0,85–0,95 |
| 6 | $1{,}8 \cdot 10^{-4}$ | 45–50 | 1,50–1,70 |
| 7 | $7{,}0 \cdot 10^{-4}$ | 65–75 | 2,00–2,20 |
| 8 | $4{,}5 \cdot 10^{-4}$ | 50–65 | 1,75–1,90 |

As is evident from the Examples presented before, with niobium below 0.5 wt. % (Example 7), the β Nb-phase is not isolated whatever, which tells negatively on corrosion resistance of the alloy. Thus, e.g., the gain in weight of the test specimen in autoclave water was equal to 65–75 mg/dm² rather than 35–50 mg/dm² for alloys comprising β Nb-phase. In addition, anticorrosion properties of the alloy are affected by the size of the β Nb-phase particles, particle spacing, volume proportion of particles and, last but not least, their niobium content. The most favorable, from the viewpoint of combining various properties, are alloy compositions as per Examples 1, 2, 3, 4, 5, and 6. In the alloys of Examples 1 and 2 their structure comprises α-solid solution with isolated β Nb-phase particles sized not in excess of 0.05 μm and the niobium content of 85–90% which corresponds to an equilibrium β Nb-phase composition. Corrosion resistance of said alloys exceeds that of an alloy with beyond-limiting values of the Nb and Fe content (Example 7) and of the prototype alloy (Example 8).

The alloys of Examples 3 and 4 further comprise intermetallics Zr—Fe—Nb (Example 3 with the Fe/Nb ratio of 0.2; Example 4 with the Fe/Nb ratio of 0.05), which add to the hardness of the alloy matrix, thereby increasing not only anticorrosion properties thereof, especially resistance to nodular corrosion, but also creep resistance and resistance to radiation growth deformation (Table 3).

The alloy of Example 5 further comprises a higher amount (0.2 wt. %) of oxygen, thus increasing creep- and radiation growth resistance and stabilizing corrosion resistance of the alloy due to hardening the α-matrix thereof (Table 3).

The alloy of Example 6 comprises a higher amount of oxygen and has a minimum niobium content which results in a reduced proportion of the β Nb-phase in the structure; however, insofar as the β Nb-phase particles are highly dispersed (having the size of 0.03 μm) and an equilibrium composition (a 75% niobium content), while the α-solid solution is oxygen-hardened, the characteristics of said alloy fall within permissible limits as to operational requirements. The structure of the material which may be obtained from the prototype alloy is not specified. It is most probable that the composition of the secondary phase in a given structure is unequilibrium, whereby the properties of the material from the prototype alloy are inferior to those of the herein-proposed material.

Oxygen-hardening of the α-solid solution adds to the hardness and creep resistance of the alloy and stabilizes corrosion resistance thereof.

Hence use of the herein-proposed alloy allows of obtaining products having a homogeneous structure and finely divided particles of the β Nb-phase of an equilibrium composition uniformly distributed in said structure. As a result of forming such a structure, the material of the product features high corrosion-, radiation growth-, and creep resistance. Presence of intermetallics Zr—Fe—Nb in the alloy structure and of iron and niobium in the α-solid solution adds to creep- and radiation growth resistance of the alloy.

Industrial Applicability

The present invention can find most utility when applied for making products used in the active core of nuclear reactors. Moreover, said alloy may be used in the chemical and medicinal industries, as well as in other fields of engineering, wherein high corrosion resistance, ductility, breaking strength, and radiation resistance are required.

What is claimed is:

1. A zirconium-based alloy for the components of the active core of nuclear reactors, comprising niobium, iron, oxygen, carbon and silicon, featured by a structure comprising an α-solid zirconium solution, which comprises nickel, with the following ratio of the constituents (on a weight percent basis):

| | |
|---|---|
| niobium | 0.5–3.0 |
| iron | 0.005–0.02 |
| oxygen | 0.03–0.02 |
| carbon | 0.001–0.02 |
| silicon | 0.002–0.02 |
| nickel | 0.003–0.02 |
| zirconium | being the balance, | and the structure of the alloy further comprises particles of the β Nb-phase which are sized below 0.1 μm and are uniformly distributed in said α-solid zirconium solution.

2. A zirconium-based alloy for the components of the active core of nuclear reactors, according to claim 1 wherein the structure further comprises particles of intermetallics Zr—Fe—Nb.

3. A zirconium-based alloy for the components of the active core of nuclear reactors, which comprises constituents taken with the following ratio therebetween (on a weight percent basis):

| | |
|---|---|
| niobium | 0.5–3.0 |
| iron | 0.005–0.02 |
| oxygen | 0.03–0.02 |
| carbon | 0.001–0.02 |
| silicon | 0.002–0.02 |
| nickel | 0.003–0.02 |
| zirconium | being the balance, | the niobium content of the β Nb-phase particles being within 79 to 95%.

4. A zirconium-based alloy for the components of the active core of nuclear reactors, which comprises said constituents taken with the following ratio therebetween (on a weight ratio basis):

| | |
|---|---|
| niobium | 0.5–3.0 |
| iron | 0.02–0.5 |
| oxygen | 0.03–0.02 |
| carbon | 0.001–0.02 |
| silicon | 0.002–0.02 |
| nickel | 0.003–0.02 |
| zirconium | being the balance, |
| the iron/niobium ration being | 0.05:0.2. |

5. A zirconium-based alloy for components of the active core of nuclear reactors which comprises said constituents taken with the following ratio therebetween (on a weight ratio basis):

| | |
|---|---|
| niobium | 0.5–3.0 |
| iron | 0.005–0.5 |
| oxygen | 0.1–0.02 |
| carbon | 0.001–0.02 |
| silicon | 0.002–0.1 |
| nickel | 0.003–0.02 |
| zirconium | being the balance, | with the niobium content of the β-particles in the Nb-phase ranging between 75 and 95%, the α-solid solution being further oxygen-hardened.

6. A zirconium-based alloy for the components of the active core of nuclear reactors according to claim 2, wherein the size of the particles of intermetallics Zr—Fe—Nb is below 0.3 μm.

7. A zirconium-based alloy for the components of the active core of nuclear reactors according to claim 4 wherein the size of the particles of intermetallics Zr—Fe—Nb is below 0.3 μm.

8. A zirconium-based alloy for the components of the active core of nuclear reactors according to claim 5 wherein the size of the particles of intermetallics Zr—Fe—Nb is below 0.3 μm.

* * * * *